March 15, 1955   L. J. HOOVER   2,704,165
HAND TRUCK
Filed Sept. 5, 1952
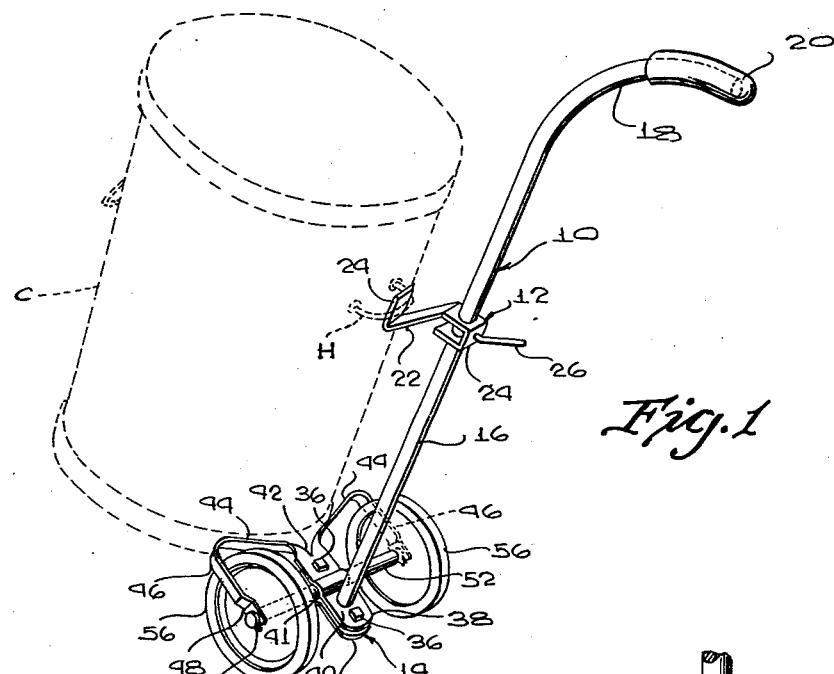
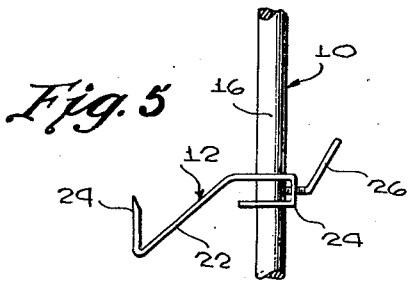
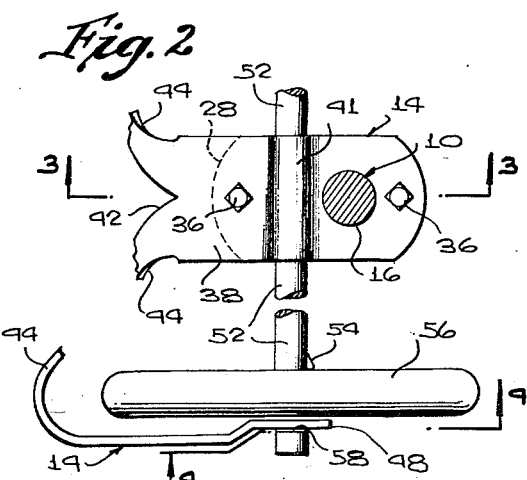
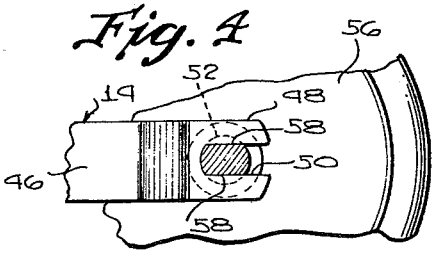
INVENTOR
Leon J. Hoover
BY
McMorrow, Berman + Davidson
ATTORNEYS

United States Patent Office 2,704,165
Patented Mar. 15, 1955

2,704,165

HAND TRUCK

Leon J. Hoover, Baton Rouge, La.

Application September 5, 1952, Serial No. 307,952

2 Claims. (Cl. 214—383)

This invention relates to hand trucks, and more particularly, has reference to a light weight truck falling in this category, particularly adapted for use in lifting and carrying such objects as garbage cans, laundry and market baskets, milk cans, trash containers, and large mopping pails.

It is one important object of the present invention to provide a wheeled hand truck of the type stated which will be particularly characterized by its adaptability for assembly or disassembly in a minimum period of time and without the aid of special tools.

Another object of importance is to provide a hand truck of the character stated which, despite its lightness and its simplified structure, will be rugged and trouble free in operation.

Yet another object is to provide a hand truck of the character stated having adjustable means adapted to engage the handle of a container to be carried thereby, said means being adjustable in a manner to adapt the same to the engagement of containers varying from one another as to the distance between their handles and their lower ends.

Still another object is to provide a hand truck as described in which the simplicity of construction and ease of assembly will be obtained by formation thereon of a wheeled base frame one part of which is integrally shaped to form a V-shaped rest for a container, an axle support, a wheel guard assembly, and a main bar support.

Other objects will appear from the following description, the claims appended thereto, and from the annexed drawing, in which like reference characters designate like parts throughout the several views, and wherein:

Figure 1 is a perspective view of a hand truck formed in accordance with the present invention, a supported container being illustrated in dotted lines in operative relation thereto;

Figure 2 is an enlarged, fragmentary top plan view illustrating a portion of the base frame;

Figure 3 is a sectional view taken substantially on line 3—3 of Figure 2;

Figure 4 is a sectional view, still further enlarged, taken substantially on line 4—4 of Figure 2, portions being broken away; and Figure 5 is a fragmentary side elevational view illustrating the container-handle-engaging means.

The reference numeral 10 has been applied generally in the drawing to designate a main bar. At 12, I have designated generally a means adjustably mounted on the main bar and adapted to engage one side handle of a supported container C, and at 14, there has been generally designated a wheeled base frame. These three assemblies constitute the main components of the hand truck.

Considering first the particular construction of the main bar 10, said main bar includes an elongated, straight length of bar stock, preferably of substantial rigidity, said length of bar stock being designated by the reference numeral 16. The straight length 16 merges into a rearwardly curved upper end portion 18, adapted to provide a handle, said end portion 18 receiving a tubular rubber grip 20.

The means carried by the main bar 10 for engaging one side handle H of a supported container has been illustrated in Figures 1 and 5, and is formed from a single length of flat bar material the intermediate portion 22 of which is projected forwardly from the main bar, and is inclined obliquely to the longitudinal center line of the main bar. The intermediate portion 22 merges at its front end into an upturned hook portion 24 engageable under the handle H of the container C.

At its other end, the inclined intermediate portion 22 of the handle engaging means is formed as a U-shaped member 24 the respective legs of which are disposed in spaced parallel relation, in planes normal to the longitudinal center line of the main bar. The legs of the U-shaped portion 24 are formed with registering openings, loosely receiving the straight portion 16 of the main bar, thus to permit adjustment of the means 12 to selected positions longitudinally of the main bar.

Threadedly engaged in the bight of the U-shaped portion 24 is a set screw 26, said set screw having its outer end portion projected laterally to provide a handle adapted to be grasped by a user. The set screw 26 is threadable into engagement with the main bar 16, in selected positions to which the means 12 is adjusted, thus to hold the means 12 in the selected position of adjustment.

By reason of this construction, it is seen that the container-handle-engaging means 12 can be positioned at desired locations upon the main bar 10, it being understood that the purpose of this arrangement is to adapt the hand truck to the lifting of containers varying from one another as to the distance between their side handles and their lower ends.

Referring to the construction of the wheeled base frame 14, said base frame includes a bottom plate 28 (Figures 1 and 3), formed from a single piece of flat bar stock. The bottom plate 28 is generally flat, and adjacent one end, is formed with an opening receiving the lower end of the straight portion 16 of the main bar 10. Said end of the main bar has a weld bead 32 underlying the bottom plate 28 of the base frame, it being understood that the main bar will be welded or otherwise fixedly secured to the bottom plate to effect a permanent, rigid connection therebetween.

Forwardly of the opening 30, the bottom plate 28 has a downwardly offset portion 34 extending transversely thereof, for a purpose to be made presently apparent.

At its opposite ends, the bottom plate 28 is provided with openings receiving bolts 36, whereby said bottom plate is separably but fixedly connected to a top plate 38.

The top plate 38 is also formed from a single piece of flat bar stock, and is disposed in substantially parallel relation to the bottom plate. The top plate 38, in this connection, is formed with an opening 40 registering with the opening 30 of the bottom plate, said opening 40 receiving the lower end portion of the main bar 10.

Forwardly of the opening 40, the top plate 38 has an upwardly offset portion 41 opposing the downwardly offset portion 34 of the bottom plate, said portions 34, 41 defining an axle seat.

As previously mentioned, the top plate 38 is formed from a single piece of flat bar stock, and said piece of stock is so shaped as to provide not only a base plate for the lower end of the main bar, but also a rest for the lower end of a supported container C, and a pair of wheel retaining bars or guards.

To provide the rest and wheel retaining bars, the elongated length of flat bar material of which the top plate is formed is slit for a substantial part of its length, the inner end of the slit terminating immediately before the forwardmost bolt 36. The slit formed in the top plate has been designated by the reference numeral 42, and defines, at opposite sides thereof, elongated portions 44 which are bent outwardly and laterally to provide container rest members that diverge forwardly from the main bar to provide a substantially V-shaped rest for the lower end of the container C (see Figure 1).

At their front or divergent ends, the divergent portions 44 merge into and are integral with rearwardly extended, substantially parallel wheel retaining bars 46, said wheel retaining bars extending rearwardly along opposite sides of the hand truck, to define side portions on the wheeled base frame 14. The wheel retaining bars 46, at their rear ends, are offset inwardly as at 48, the inwardly offset portions of the wheel retaining bars having longitudinal slots 50 (Figure 4) opening upon the rear end edges of said wheel retaining bars.

An axle has been designated by the reference numeral 52, and is disposed transversely of the base frame. The mid-length of the axle is disposed in the axle seat previously described, and is clampably engaged between the top and bottom plates 38, 28, when the bolts 36 are engaged threadedly with associated nuts.

Spaced inwardly from the opposite ends of the axle 52 are outwardly projected barbs or lugs 54, said barbs being struck out of the material of which the axle is formed, to engage the inner ends of the hubs of wheels 56, thus to prevent movement of said wheels inwardly of the axle 52.

The wheel retaining bars 46 extend along the outer sides of the wheels 56, and have their slotted end portions engaged in diametrically opposite grooves 58 (Figure 4) formed in the ends of the axle.

In this way, the base frame is completely assembled, and it will be seen that there will be no possibility of the wheels becoming accidentally disengaged from the axle 52 on which they are rotatably mounted.

The construction is one which permits the hand truck to be moved into a position adjacent an upright container C. By tilting the hand truck forwardly, the hook member 24 is engaged under a side handle H of the container. The hand truck is then tilted rearwardly, and the V-shaped rest of the base frame will engage the lower end of the container, causing the container to be lifted off the floor or ground, and readily moved to the desired location.

In this connection, it is important to note that the particular construction of the hand truck adapts said hand truck for manufacture from inexpensive, readily fabricated materials, the hand truck being formed mainly from conventional flat and cylindrical bar stock.

Further, it is considered to be an important characteristic of the invention that the manner in which the hand truck is formed and assembled permits it to be shipped in a knocked-down condition, thus to save space while the hand truck is being shipped. On arrival at its destination, the hand truck can of course be swiftly assembled, since the two bolts 36 cause all the portions of the base frame and main bar to be joined in their desired relationship, ready for use. This is considered to be an important feature of the construction, and it is to be noted that the desired result is obtained entirely by the particular formation and relative arrangement of the parts of the base frame, and the particular formation and relative arrangement of the main bar and means 12.

Thus, in assembling the device, the top plate 38 can first be assembled with its associated axle 52 and wheels 56, it being merely necessary that the axle be inserted through the slots 50, after which the base plate 38, wheels, and axle can be slipped over the upper end of the main bar 10. The top plate is then adjusted downwardly along the main bar, until the axle is engaged between the top plate and bottom plate 28. The bolts 36 are then applied to the plates. The means 12 can then be slipped over the upper end of the handle, after which the grip 20 is applied to the handle, completing the assembly of the device.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a knock-down hand truck, an axle having opposite outer ends, lugs projecting laterally from the axle at points spaced inwardly from said outer ends, wheels journaled on said axle between said lugs and the outer ends of the axle, a load carrying frame comprising a clamp removably embracing the axle between said lugs, said clamp having a portion projecting laterally beyond one side of the axle, divergent arms fixed on said portion, said arms having outer ends extending spacedly around the peripheries of the wheels, extensions on the said outer ends of the arms, said extensions extending spacedly along the outer sides of the wheels, said extensions having terminals retainably engaging the outer sides of the wheels whereby the wheels are retained on the axle between the lugs and said terminals, and means separably connecting the said terminals with outer end portions of the axle, said separable connecting means comprising opposed grooves in the axle between the outer ends of the axle and the wheels, and slots in said terminals defining opposed fingers received in said grooves.

2. In a knock-down hand truck, an axle having opposite outer ends, lugs projecting laterally from the axle at points spaced inwardly from said outer ends, wheels journaled on said axle between said lugs and the outer ends of the axle, a load carrying frame comprising a clamp removably embracing the axle between said lugs, said clamp having a portion projecting laterally beyond one side of the axle, divergent arms fixed on said portion, said arms having outer ends extending spacedly around the peripheries of the wheels, extensions on the said outer ends of the arms, said extensions extending spacedly along the outer sides of the wheels, said extensions having terminals retainably engaging the outer sides of the wheels whereby the wheels are retained on the axle between the lugs and said terminals and means separably connecting the said terminals with outer end portions of the axle, and a handle secured to and projecting from said clamp, and a load carrying member on said handle comprising a U-shaped bar having spaced legs provided with holes receiving the handle, said bar having a bight portion, and a position locking screw threaded through said bight portion and engaging the handle.

References Cited in the file of this patent

UNITED STATES PATENTS

| 372,137 | George | Oct. 25, 1887 |
| 1,255,484 | Stephens | Feb. 5, 1918 |
| 1,821,276 | Roe | Sept. 1, 1931 |
| 2,417,918 | Fatur | Mar. 25, 1947 |
| 2,472,670 | McFarland | June 7, 1949 |
| 2,554,091 | Davis | May 22, 1951 |
| 2,600,577 | Roe | June 17, 1952 |
| 2,616,577 | Barrett | Nov. 4, 1952 |

FOREIGN PATENTS

| 959,450 | France | Sept. 26, 1949 |